April 29, 1941. S. T. WEBSTER 2,240,322
SPEED CONTROL APPARATUS
Filed Aug. 24, 1939
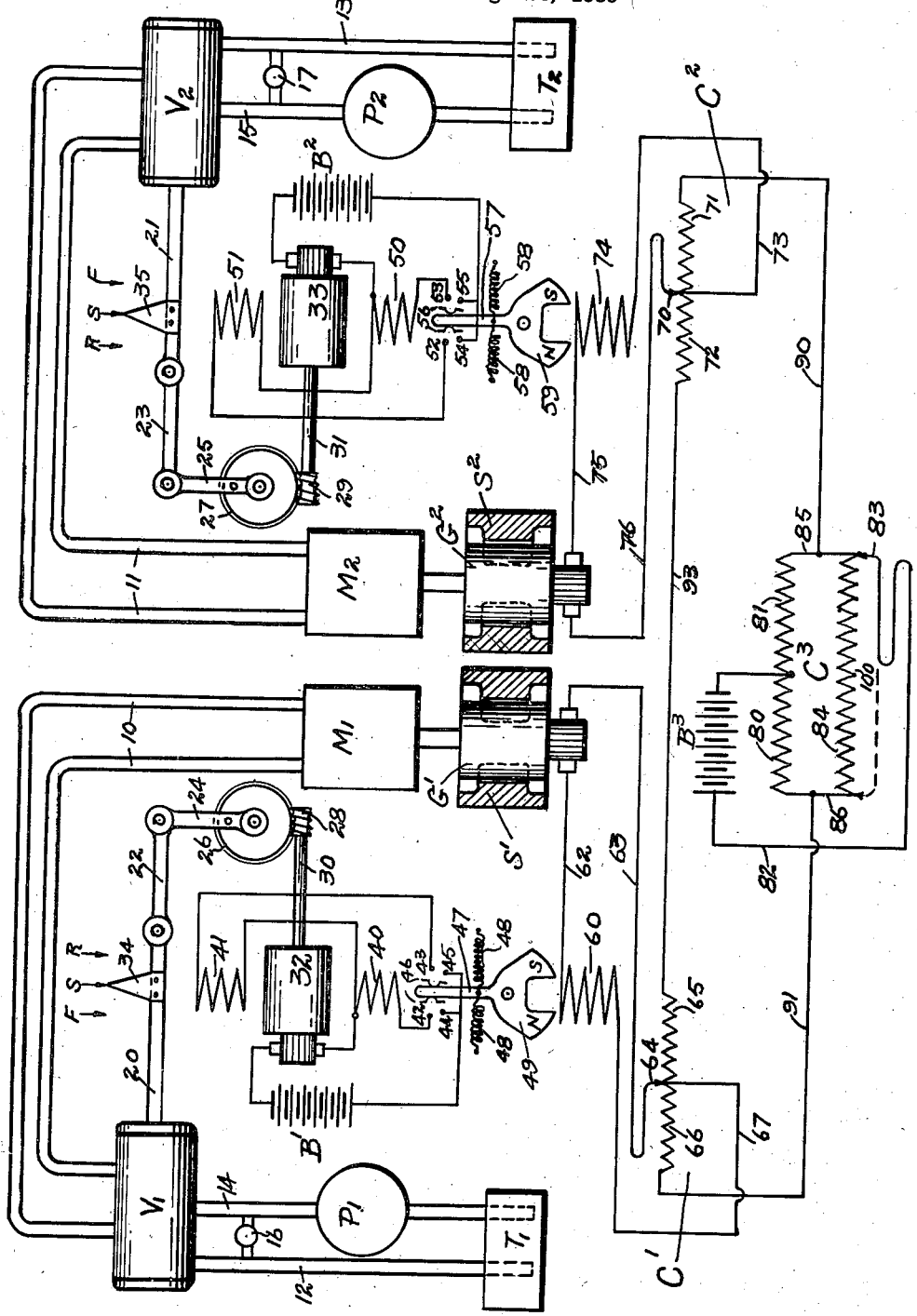
Inventor
Samuel T. Webster Patented Apr. 29, 1941

2,240,322

UNITED STATES PATENT OFFICE 2,240,322

SPEED CONTROL APPARATUS

Samuel T. Webster, Worcester, Mass.

Application August 24, 1939, Serial No. 291,794

5 Claims. (Cl. 60—97)

This invention relates to the control of speed in a plurality of electric or hydraulic motors or other motor units.

It is the general object of my invention to provide apparatus by which the speed of each motor unit may be separately regulated, and by which also the speeds of all of the motor units may be increased or decreased simultaneously, while maintaining an established speed ratio between the different units.

A further object of the invention is to provide apparatus to simultaneously control the directions of rotation of different motor units (assuming the same to be reversible), as well as controlling the motor unit speeds, and while also maintaining an established speed ratio between the different units.

To the attainment of these objects, I provide a manually adjustable controller for each motor unit, and a master controller for all of the units.

A preferred form of the invention is shown in the drawing which is a diagrammatic view showing certain hydraulic motors and associated mechanism, with my improved control apparatus applied thereto.

Referring to the drawing, I have shown two hydraulic motors M' and M² driven by pumps P' and P² which draw liquid from tanks T' and T² and which are provided with valves V' and V² by which the speed and direction of rotation of the motors may be directly controlled.

The motors are connected to their respective valves by pipes 10 and 11, and return pipes 12 and 13 are provided, which are also connected to the pressure pipes 14 and 15 by relief valves 16 and 17 through which the pumps discharge any excess oil not used by the motors when the valves are in such positions as to throttle the oil flow to the motors.

The valves V' and V² are provided with valve stems 20 and 21 connected by links 22 and 23 to crank arms 24 and 25 fixed to worm gears 26 and 27 and angularly movable therewith. The worm gears are moved by worms 28 and 29 mounted on the armature shafts 30 and 31 of auxiliary motors 32 and 33, preferably of commutator type. Rotation of either of these motors 32 or 33 in either direction will correspondingly shift the associated valve, thus controlling the speed and direction of rotation of the corresponding motor M' or M².

Index pointers 34 and 35 move with the valve stems 20 and 21 and indicate the positions of the valves on suitable scales which may bear the letters F, S and R as shown, indicating "forward," "stop" and "reverse."

The auxiliary motor 32 is provided with reversely wound field coils 40 and 41 connected to terminals 42 and 43. Associated terminals 44 and 45 are jointly connected to one pole of a battery B' or other suitable source of power, the other pole of the battery being connected to one of the brushes of the motor 32, with the other brush connected to the field coils.

When the field coil 40 is energized, the motor 32 will revolve in one direction, and when the coil 41 is energized, the motor will revolve in the opposite direction.

The motor 33 is correspondingly provided with field coils 50 and 51, connected to terminals 52 and 53, and having associated terminals 54 and 55 connected to a battery B² or other suitable source of power.

Contact plates 46 are mounted on a swinging arm 47 and are adapted to close the circuit through the terminals 42—44 or the terminals 43—45, according to the direction in which the arm 47 is displaced. Springs 48 normally maintain the arm 47 in mid or neutral position. The arm 47 is part of a permanent magnet 49 having poles N and S and caused to swing in one direction or the other by electrical control means to be described.

Similar plates 56 are provided for the motor 33, said plates being supported by an arm 57 normally centered by springs 58 and forming part of a permanent magnet 59 having poles N and S.

A control device C' is provided for the arm 47, thereby determining the selected position of the valve V', and a similar control device C² is provided for the arm 57, thereby determining the selected position of the valve V².

The control device C' comprises a coil 60 which coacts with the permanent magnet 49 to swing the arm 47 to the right or left from neutral position, according to the direction of current flow through the coil 60.

One end of the coil 60 is connected through a wire 62 to one of the brushes of a small commutator type generator G', the armature of which coacts with a permanent magnet field system S'. The generator G' is continuously driven in constant speed relation to the motor M', and the direct current voltage generated by G' is proportional to the speed of motor M'. The other brush of the generator G' is connected through a wire 63 to a contactor 64 which is movable manually along equal resistances 65 and 66 and which may make contact therewith at any point in either resistance. The contactor 64 thus manually determines the normal speed and direction of rotation of the motor M'. At their adjacent ends, the resistances 65 and 66 are jointly connected by a wire 67 to the coil 60.

Precisely similar connections are provided in the control mechanism $C^2$, including a contactor 70, equal resistances 71 and 72, a wire 73 from the adjacent ends of the resistances to a coil 74, and wires 75 and 76 connecting the coil 74 and the contactor 70 respectively with the brushes of a commutator type generator $G^2$, the armature of which coacts with a permanent magnet field system $S^2$. The generator $G^2$ is continuously driven in constant speed relation to the motor $M^2$ and the direct current voltage generated by $G^2$ is proportional to the speed of the motor $M^2$.

I also provide a master controller $C^3$ which comprises equal resistances 80 and 81 having their adjacent ends jointly connected to a battery $B^3$ or other source of direct current. The opposite pole of the battery is connected through a wire 82 to a contactor 83 which may be manually moved to engage a control resistance 84 at any desired point.

One end of the control resistance 84 is connected by a wire 85 to the free end of the resistance 81, and the opposite end of the resistance 84 is connected by a wire 86 to the free end of the resistance 80.

The wire 85 is connected by a wire 90 to the free end of the resistance 71 in the controller $C^2$, and the wire 86 is connected by a wire 91 to the free end of the resistance 66 in the controller C'. The free ends of the resistances 65 and 72 are connected by a wire 93.

The operation of my improved control apparatus is as follows:

Assuming that the contactor 83 of the master controller $C^3$ is in the position shown in full lines and that the contactor 83 is connected with one pole of the battery $B^3$ as shown and described, there will then be two internal and one external return circuit available from the contactor 83 to the other pole of the battery $B^3$, all of said circuits being parallel.

One internal circuit is through the resistance 81, a second internal circuit is through the resistances 84 and 80 in series, and the third or external circuit is through the wire 90, resistances 71 and 72, wire 93, resistances 65 and 66, wire 91 and resistance 80. A strictly proportional part of the current will flow through the external circuit and through the controllers C' and $C^2$. As the total current flow is negligible, the waste of current by flowing through the internal circuits is immaterial.

If the contactor 83 is moved toward the central point 100 of the control resistance 84, the amount of current flowing through the external circuit described will be reduced as an increasing part of the resistance 84 is introduced into the external circuit.

When the contactor 83 reaches the middle point 100, the branch circuits through the right and left halves of the resistance 84 and through the resistances 80 and 81 will be balanced so that the wires 85 and 86 will be at the same potential and there will be no current flowing through the external circuit.

When the contactor 83 is moved further to the left beyond the neutral point 100, a current will flow in the opposite direction in the external circuit 91, 66, 65, 93, 72, 71 and 90, and since the resistance 84 is wound with uniform resistance per unit length, the current will be proportional to the distance contactor 83 is moved from point 100.

Assume that the individual controllers C' and $C^2$ are set to cause M' and $M^2$ to rotate in some definite speed ratio, and to run in certain directions, and assume that the contactor 83 of the controller $C^3$ is in the extreme right-hand position shown by full lines. Then, if 83 is moved over to the extreme left-hand position, as shown by dotted lines, both motors would come to a stop, accelerate in the opposite direction, and finally reach their original speeds.

The contactor 83 may be moved manually, as by a suitable lever or hand wheel arrangement, to various points of contact with the resistance 84, or any suitable automatic means may be provided for moving the contactor 83 in accordance with any selected phenomena.

The operation of the master controller $C^3$ on the separate primary controllers C' and $C^2$ is the same for both units and will now be described with reference to the controller C' and the motor M'.

The contactor 64 of the controller C' is shown in the drawing as being in mid position and as engaging the resistances 65 and 66 at their common point of attachment to the wire 67. Under these conditions, no current will flow through the coil 60, the arm 47 will remain in mid position, and there will be no operation of the motor 32 to shift the valve V' from mid or neutral position.

If, however, the contactor 64 is moved to the right or to the left from the position shown, there will then be a difference in potential between the contactor 64 and the wire 67, thus causing current to flow in one direction or the other through the coil 60 and correspondingly displacing the arm 47 to close a circuit through one or the other of the field coils 40 and 41 of the motor 32.

The motor 32 will then revolve and will turn the worm 28 to shift the valve V' to start the motor M' in a desired direction. This simultaneously starts the generator G', which is so connected that it generates a voltage in the circuit of the controller C' which is opposite in potential to the voltage developed by movement of the contactor 64 from mid position as above described.

As the motor M' increases in speed, a point will be reached where these two voltages neutralize each other, whereupon the current in coil 60 is reduced to zero and the arm 47 returns to mid position, leaving the valve V' in the position to which it has been moved by the motor 32. The motor M' thereafter continues to operate at a speed directly dependent on the displacement of the contactor 64.

If the motor M' should tend to further increase its speed, the voltage generated by the generator G' will overbalance the voltage due to the position of the contactor 64, and the current in coil 60 will be reversed and move the arm 47 in the opposite direction, thereby causing the motor 32 to reversely adjust the valve V' until a balanced position is reached.

If the displacement of the contactor 64 is to the right, the motor 32 will shift the valve V' in one direction, while if the displacement is to the left, the valve V' will be shifted in the opposite direction.

It should be noted that the controllers C' and $C^2$ are independent, so that the contactor 64 in the controller C' may be set to cause the motor M' to operate at a certain speed forward or clockwise, while the contactor 70 in the controller C2 may be set at such a point that the motor M² will operate at half speed in the reverse direction. Any other desired combination may be selected.

In any event, movement of the contactor 83 along the resistance 84 will vary the current flowing through the external circuit of the controller C³ and will thus vary the current which flows through the coils 60 and 74, so that these currents will be neutralized at relatively higher or relatively lower speeds of the generators G' and G², which rotate with the motors M' and M² respectively.

Consequently, by shifting the contactor 83, the speed of both motors may be increased or decreased or even reversed, but the speed ratio between the two motors will remain unchanged. Also, if the direction of rotation of one motor is reversed by adjustment of controller C³, the direction of rotation of the other motor will be simultaneously reversed.

The small generators G' and G², being of the brush-commutator type with permanent magnet field systems, are particularly adapted for use in my control apparatus, as the voltage is directly proportional to the armature speed and is reversed if the direction of armature rotation is reversed. Thus a voltage proportioned to the speed of M' or M² is always generated of such polarity as to oppose and finally neutralize the voltage on the associated coil 60 or 74.

I have thus provided very simple mechanism for separately controlling each of two motors, both as to speed and direction of rotation, and I have also provided a simple master controller by which both motors may be simultaneously adjusted as to speed and direction without change in the established speed ratio.

While I have shown my invention as controlling two motors only, it will be obvious that additional resistances may be introduced into the external circuit for the control of additional motor units.

Having thus described my invention and the advantages thereof, I do not wish to be limited to the details herein disclosed, otherwise than as set forth in the claims, but what I claim is:

1. In a means to control the speeds of a plurality of motors, that improvement which comprises a resistance unit having a variable resistance in parallel with two fixed resistances in series, an external control circuit connected to the common terminals of said parallel resistance circuits, and a current supply connected to the junction of said fixed resistances and to a shiftable contactor for said variable resistance.

2. In a means to control the speeds of a plurality of motors, that improvement which comprises a resistance unit having a variable resistance in parallel with two fixed resistances in series, an external control circuit connected to the common terminals of said parallel resistance circuits, and a current supply connected to the junction of said fixed resistances and to a shiftable contactor for said variable resistance, said fixed resistances being equal in resistance value.

3. In a means to control the speeds of a plurality of motors, that improvement which comprises a resistance unit having a variable resistance in parallel with two fixed resistances in series, an external control circuit connected to the common terminals of said parallel resistance circuits, and a current supply connected to the junction of said fixed resistances and to a shiftable contactor for said variable resistance, said fixed resistances being equal in resistance value, and said external circuit having control devices therein for a plurality of motor units.

4. The combination in a speed control means as set forth in claim 3, in which the external circuit also has a pair of equal resistances for each controlled motor unit, all of said resistances being in series in said external circuit, and in which each motor unit has a separate speed control circuit including a source of current supply, one end of said separate circuit being connected to the junction between the two associated equal resistances for said unit and the other end of said circuit being connected to a contactor shiftable to any point on either of said equal resistances, whereby the speed and direction of rotation of each motor unit may be separately adjusted by movement of its shiftable contactor and whereby the speeds of all of said motor units may be simultaneously and proportionately varied by moving the first-mentioned contactor along its variable resistance.

5. A speed control unit comprising two equal fixed resistances in series, a third resistance connected in parallel with said two fixed resistances, an external control circuit connected to the common terminals of said parallel resistance circuits, a contactor shiftable along said third resistance and connected to a source of current supply, and a connection from said source of supply to the junction between said two fixed resistances.

SAMUEL T. WEBSTER.